E. HICKOK AND A. H. HOLLENBECK.
CATTLE GUARD.
APPLICATION FILED OCT. 13, 1919.
1,344,535.
Patented June 22, 1920.
2 SHEETS—SHEET 2.
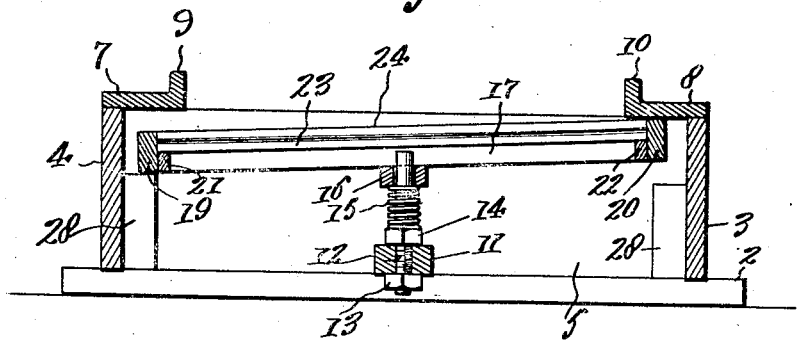
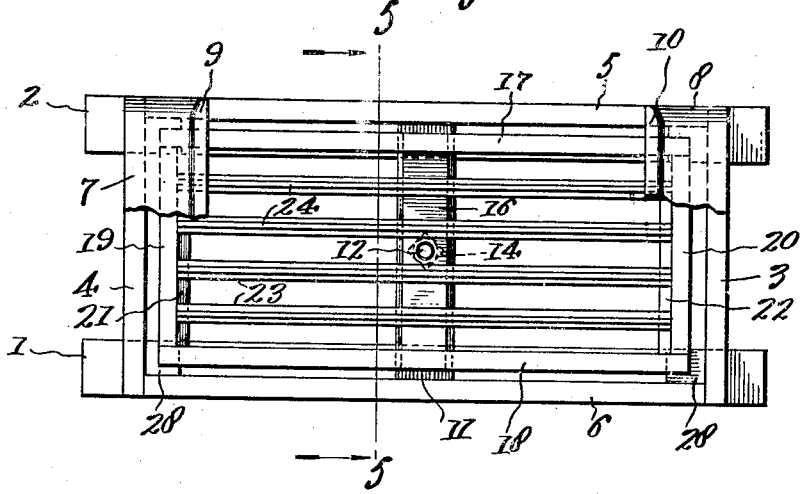
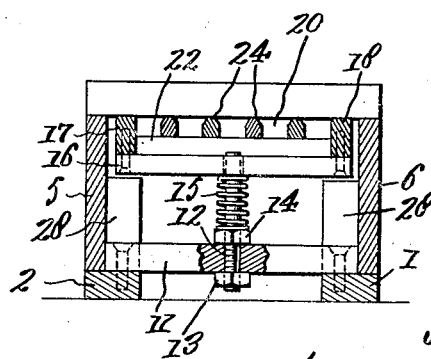
Inventors.
E. Hickok and
A. H. Hollenbeck.
by F. E. Hunter.
Attorney.

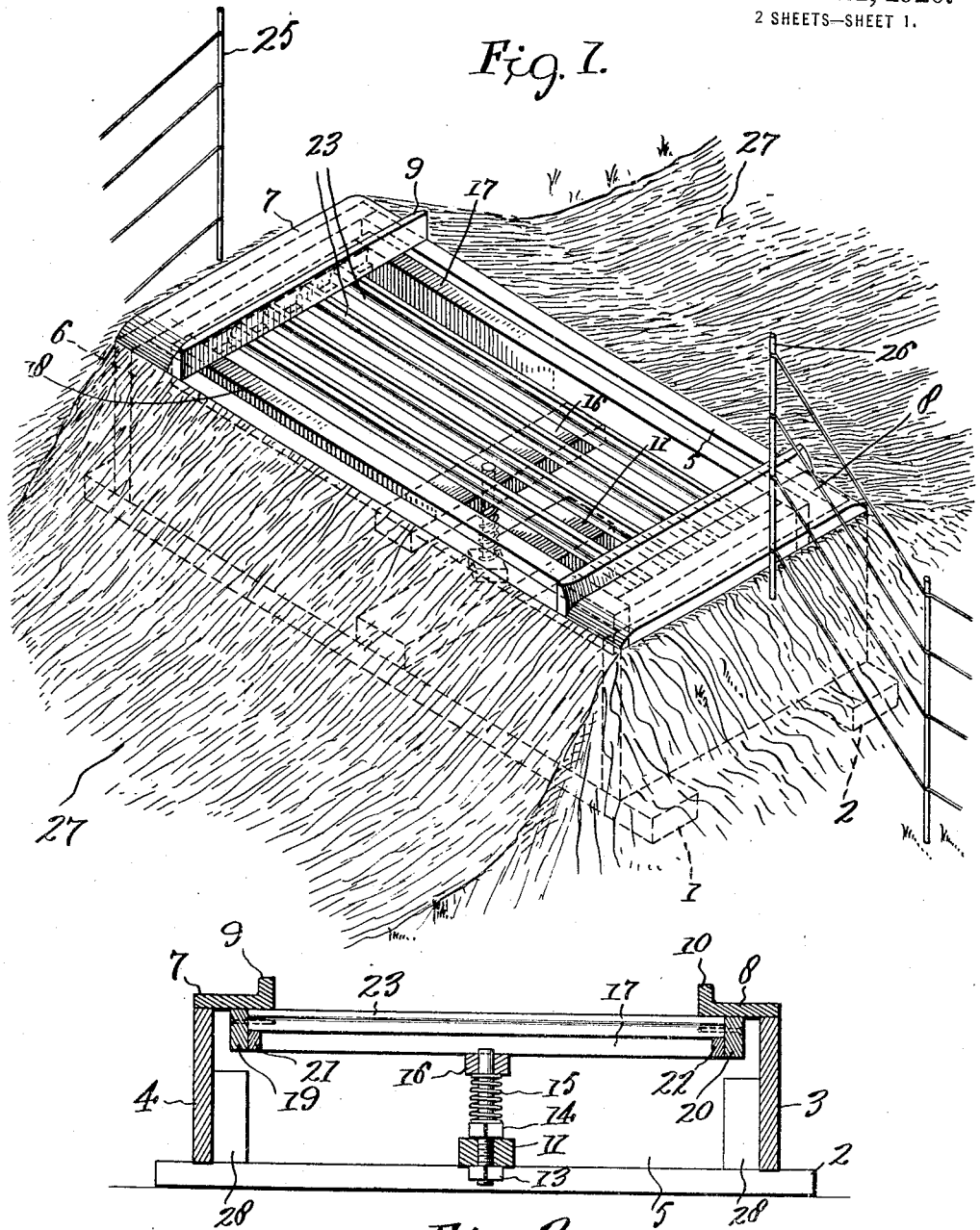

UNITED STATES PATENT OFFICE.

EMORY HICKOK, OF ENGLE, AND ALBERT H. HOLLENBECK, OF FAIR VIEW, NEW MEXICO.

CATTLE-GUARD.

1,344,535.  Specification of Letters Patent.  Patented June 22, 1920.

Application filed October 13, 1919. Serial No. 330,273.

*To all whom it may concern:*

Be it known that we, EMORY HICKOK and ALBERT H. HOLLENBECK, citizens of the United States, residing at Engle and Fair View, respectively, in the county of Sierra and State of New Mexico, have invented certain new and useful Improvements in Cattle-Guards; and we do hereby declare the following to be a full, clear, and exact description of the invention, such as will enable others skilled in the art to which it appertains to make and use the same.

The present invention relates to improvements in cattle guards, and is intended for use more particularly on automobile roads passing through pastures which are required by some State laws to be unobstructed and to be kept at all times open for the continuous and rapid passage of automobiles.

It is an object of the present invention to provide an improved cattle guard which will be effective in preventing the straying of cattle from the pasture through the gap in the fence left for the passage of the vehicle road, while at the same time not obstructing the road in any manner to the passage of vehicles.

The invention will be more fully understood after reference to the accompanying drawings, in which like parts are indicated by similar reference symbols throughout the several views, in which:

Figure 1 is a perspective view showing an improved cattle guard constructed in accordance with the present invention in a position of use on a vehicle road at a gap in a pasture fence.

Fig. 2 is a vertical sectional view taken through the guard and showing the foundation on which same is mounted.

Fig. 3 is a section similar to Fig. 2 showing the guard canted.

Fig. 4 is a top plan view of the guard with the vehicle treads partly broken away; and Fig. 5 is a sectional view taken on the line 5—5 in Fig. 4.

Referring more particularly to the drawings, 1 and 2 are cleats extending transversely of the roadway and spaced apart; these cleats being intended to rest upon the roadway and to support a box-like structure which contains the improved cattle guard and which forms a unitary structure so that the same may be transported and laid on the roadway in the fence gap wherever desired.

The cleats 1 and 2 are spaced apart as shown and arranged in substantially parallel relation so that, as shown in Fig. 5, access may be had to the interior of the box-like structure for the purpose of making adjustment or repairs through the space left between the two cleats. The ends of the cleats 1 and 2 extend beyond the ends 3 and 4 of the box so that they may embed themselves in the ground and resist any tilting motion of the box or the displacement thereof.

The ends 3 and 4 of the box are assembled on the cleats 1 and 2 and secured thereto in any desired manner, as are also the sides 5 and 6 of the box, which together with the ends 3 and 4 form an inclosure which is open at the top and the bottom.

Treads 7 and 8 are mounted upon the top of the box at the opposite ends thereof and are spaced apart the proper distance to receive the wheels of wagons or automobiles so that vehicles may pass freely over the guard. The treads are also preferably provided with flanges 9 and 10 to guide the wheels on the treads and prevent the wheels from accidentally escaping onto the grid.

On the inside of the box and approximately at the center thereof, is a cross piece 11 supported upon and secured in any desired manner to the cleats 1 and 2. This cross piece 11 has a central perforation to receive a post 12 which is threaded at its lower end and receives the binding nuts 13 and 14 disposed respectively below and above the cross piece 11 and which act to hold the post 12 in an upright position extending up from the center of said cross piece.

A coil spring 15 is wound about the post 12 above the upper nut 14 and the lower end of such coil spring 15 rests upon said nut 14. The post at its upper end is adapted to receive a beam 16 which is perforated centrally so that it may fit over the upper end of the post 12 and slide up and down thereon; this beam 16 resting upon the upper end of the coil spring 15 and being yieldingly supported thereby.

Longitudinal rails 17 and 18 are secured in any desired manner to the opposite ends of the beam 16, and such rails 17 and 18 are secured at their ends to cross bars 19 and 20. The rails 17 and 18 and bars 19 and 20 form a substantially rectangular frame which is supported upon the beam 16, and is capable of executing a variety of movements.

Strips 21 and 22 are carried by the end bars 19 and 20, and on these strips are mounted longitudinal bars 23 having their upper ends pointed or sharpened, as indicated at 24. The bars 23 are spaced apart in the manner indicated in Figs. 1 and 5, so as to leave slots therebetween and form an open-work grid for all purposes impassible to animals.

In Fig. 1 portions of a fence are indicated at 25 and 26, the adjacent ends of which are spaced apart to provide a gap through which the road indicated at 27 may pass. The improved cattle guard is adapted to be placed in the gap in the fence.

In use, automobiles and other vehicles will have a free passage over the road 27 and through the gap in the fence 25, 26, by passing over the treads 7 and 8 which are sufficiently wide to accommodate the wheels of a vehicle, but entirely too narrow to allow of the passage therethrough of cattle. Cattle in the pasture inclosed by the fence 25, 26, will be prevented from wandering through the gap and escaping from the pasture by reason of the fact that they must cross the gap which necessitates their walking over the spaced bars 23, which are very thin and pointed and altogether unsuited to the hoofs of these animals.

In addition to this deterrent, the weight of the cattle upon the frame or grid, will cause this frame to oscillate either longitudinally as indicated in Fig. 3 or transversely about the central post 12, and the frame will simultaneously have a vertical depressing movement, causing the compression of the coil spring 15. Blocks 28 are set in the corners of the box to act as stops for the grid when the same oscillates.

This rocking motion of the grid is intended to appeal to the animal's timidity and serves to prevent venturing on the guard.

From the foregoing it will be appreciated that we have provided an improved cattle guard which will effectually prevent the straying of animals from pasture, and at the same time allow the free passage of vehicles over a road which passes through a gap in the pasture fence, and that the use of our invention may be conducted without making any excavations in roadways, the box-like structure being merely placed upon the road and runways of earth placed up to the treads 7 and 8, as indicated in Fig. 1.

It will be obvious that various modifications might be made in the herein described apparatus, and in the construction and combination of parts which would be used without departing from the spirit of our invention; and we do not mean to limit our invention to such details except as particularly pointed out in the claims.

Having thus described our invention what we claim and desire to secure by Letters Patent of the United States is—

1. An improved cattle guard adapted for placement on a roadway and including a frame mounted for shifting motion and adapted to be shifted in response to the weight of cattle imposed thereon, and fixed treads over said frame to receive the wheels of vehicles, substantially as described.

2. An improved cattle guard including a box-like structure forming a unit and being open at the top and bottom, a grid movably supported in the top of the box, and treads passing over the top of the box near the ends thereof, substantially as described.

3. An improved cattle guard comprising a box-like structure adapted to be placed on a roadway and having an open upper end, treads passing over the open upper end thereof, and a frame supported for oscillating and depressible movements in the upper open portion of the frame and comprising thin spaced apart bars, substantially as described.

4. In an improved cattle guard comprising a box-like structure, cleats supporting said box-like structure and extending beyond the ends thereof, said cleats adapted to rest on a roadway, treads passing over the upper end of the box-like structure, an oscillating and depressible frame composed of spaced apart thin bars arranged in the upper portion of said structure, means for yieldingly supporting said frame, and stepped means in the box for limiting the movement of said frame, substantially as described.

5. In an improved cattle guard, a vertically disposed bolt, and a platform supported on said bolt and adapted to oscillate both longitudinally and transversely on said bolt, substantially as described.

6. In an improved cattle guard, a box-like structure having an open upper end, a platform of grid structure mounted in the upper end of said platform, and means for centrally supporting said platform from within the box-like structure adapted to allow the platform to oscillate in a plurality of directions and also acting to permit a depressible movement of the platform as a whole, substantially as described.

7. In an improved cattle guard, a box-like structure having an open upper end, an open-work platform placed in the open upper end of the box-like structure, a vertically arranged bolt in the box-like structure placed substantially centrally beneath said platform, said platform adapted to oscillate in a plurality of directions about said bolt, resilient means associated with the bolt for yieldingly sustaining the platform and permitting a depressible movement therein, and stops in the box-like structure for limiting the oscillating movement of the platform in any direction, substantially as described.

8. In an improved cattle guard, a box-like structure, a pair of cleats supporting said box-like structure, a cross piece centrally supported on said cleats, a bolt vertically supported substantially centrally in said cross piece, a platform composed of end and central transverse beams, and longitudinal bars supported by said beams, said central beam mounted over the upper end of said bolt and permitting the platform to oscillate in a plurality of directions about the bolt, stop blocks mounted in the corners of said box-like structure for limiting the oscillating movement of the platform in any direction, and a coil spring wound about said bolt and supporting said central beam and platform for depressible movement, substantially as described.

In testimony whereof we affix our signatures.

EMORY HICKOK.
ALBERT H. HOLLENBECK.